(No Model.)

A. F. LAIRD & J. M. HILL.
COTTON SACK CARRIER.

No. 509,540. Patented Nov. 28, 1893.

Witnesses.

Inventors.
Archibald F. Laird,
John M. Hill.

By their Attorneys,

UNITED STATES PATENT OFFICE.

ARCHIBALD F. LAIRD AND JOHN M. HILL, OF THORNTON, TEXAS.

COTTON-SACK CARRIER.

SPECIFICATION forming part of Letters Patent No. 509,540, dated November 28, 1893.

Application filed July 28, 1893. Serial No. 481,768. (No model.)

*To all whom it may concern:*

Be it known that we, ARCHIBALD F. LAIRD and JOHN M. HILL, citizens of the United States, residing at Thornton, in the county of Limestone and State of Texas, have invented a new and useful Cotton-Sack Carrier, of which the following is a specification.

Our invention relates to a truck for carrying cotton sacks through and from the cotton field, to avoid the necessity of carrying the same upon the shoulders or dragging them upon the ground; and it has for its objects to provide a truck having means for the adjustment of the axle, whereby the latter may be arranged at an inclination to cause the truck to travel upon a curved line to facilitate the guiding of the same in operation; and furthermore, to provide a fender to prevent objects from falling between the cotton sacks and the wheels of the truck.

Further objects and advantages of this invention will appear in the following description, and the novel features thereof will be particularly pointed out in the appended claims.

Figure 1:
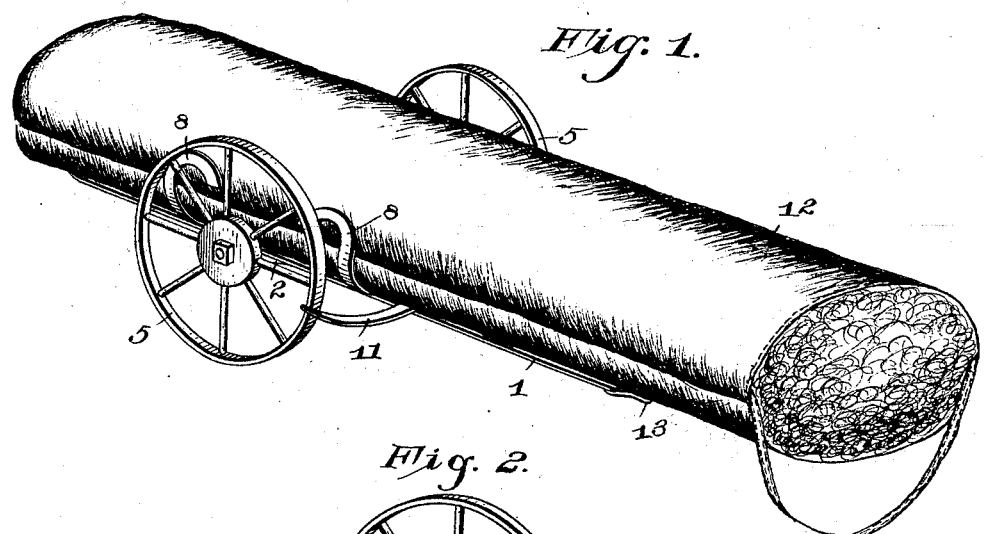
Figure 2:
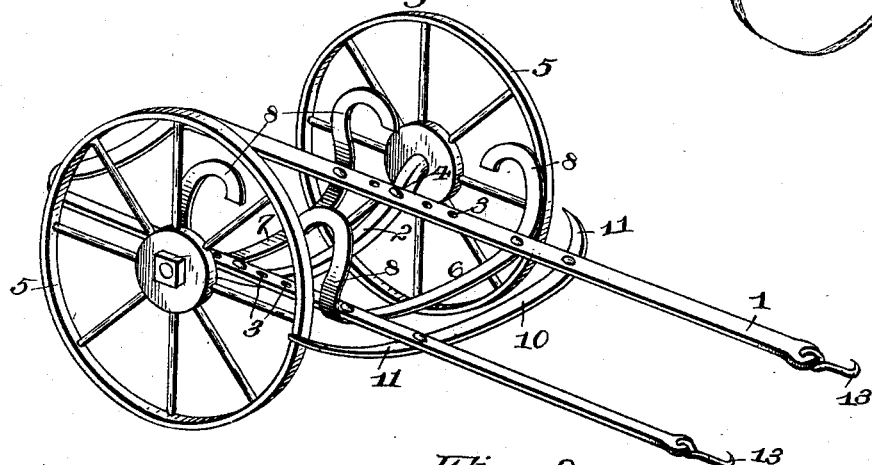
Figure 3:
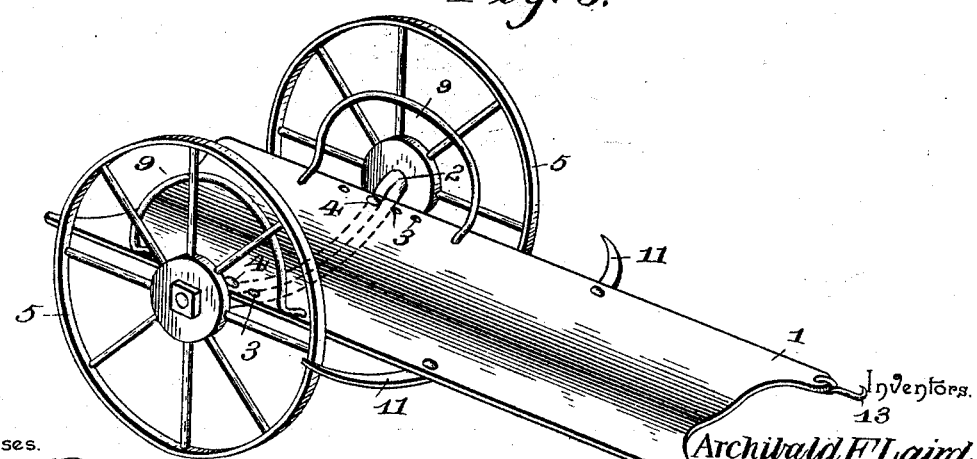

In the drawings: Figure 1 is a perspective view of a truck embodying our invention, with a sack arranged thereupon in the operative position. Fig. 2 is a similar view with the sack removed. Fig. 3 is a perspective view of a slightly modified form of truck.

Similar numerals of reference indicate corresponding parts in all the figures of the drawings.

1 represents the framework of the truck, which in Figs. 1 and 2 is shown of skeleton construction, and in Fig. 3 is shown constructed of a plate of metal, and 2 represents a bowed axle which is secured to the framework and conforms to the shape of the section thereof.

The framework is provided, near its sides, with series of perforations 3, with which are engaged the bolts 4 to secure the axle in place. This construction allows the axle, as shown in Figs. 2 and 3, to be arranged at an inclination to the body of the truck in order that one of the wheels 5 may be arranged in advance of the other to cause the device to turn either to the right or to the left.

6 represents side fenders which, in Figs. 1 and 2, are formed as continuations of the transverse bars 7 and are turned up at their extremities and bent toward each other in pairs to form the curved arms 8. In Fig. 3 these curved arms 8 are united in pairs to form loops 9.

10 represents a wheel-fender, which is secured transversely upon the framework of the truck, extends at its ends beyond the sides thereof, and is provided with terminal hooks 11, which extend rearwardly and terminate outside of the wheels. The side fenders are adapted to coact with the troughed or depressed shape of the truck to maintain the sack in the proper position when filled, said sack 12 being secured to the truck by any well-known or approved devices, such as the fastening-wires 13; and the wheel-fenders prevent stalks and the like from falling or crowding between the sack and the wheels and interfering with the motion of the truck.

The convenience of arranging the axle at an inclination to throw the wheels out of transverse alignment and thus causing the truck to pursue a curved course through the field will be apparent to those skilled in the art and is due to the fact that the picker is enabled to move through the field in a curved direction without devoting especial attention to the guiding of the truck.

Various changes in the form, proportion, and the minor details of construction may be resorted to without departing from the principle or sacrificing any of the advantages of this invention.

Having described our invention, what we claim is—

1. In a truck, the combination with the body-portion, of a wheel-carrying axle, and means for adjusting the same in a horizontal plane along the body portion, whereby it may be arranged at an inclination to the body-portion to dispose one wheel in advance of the other, substantially as specified.

2. In a truck, the combination of the troughed or depressed body-portion, a bowed axle, adjustable securing bolts to fasten the axle to the body-portion and adapted to engage any one of a series of perforations in the body-portion, and wheels carried by the axle and adapted by the adjustment thereof to be arranged at an inclination to the body-portion of the truck, substantially as specified.

3. In a truck, the combination with the body-portion and carrying-wheels, of a transversely-disposed fender having terminal hooked arms which extend rearwardly and terminate near the outer surfaces of the carrying-wheels, substantially as specified.

In testimony that we claim the foregoing as our own we have hereto affixed our signatures in the presence of two witnesses.

ARCHIBALD F. LAIRD.
JOHN M. HILL.

Witnesses:
  J. L. WHITE,
  W. H. FOX.